United States Patent [19]

Butler

[11] Patent Number: 4,733,966

[45] Date of Patent: Mar. 29, 1988

[54] TUNING MECHANISM FOR DITHER FREQUENCIES IN A RING LASER GYROSCOPE

[75] Inventor: Alfred L. Butler, Thousand Oaks, Calif.

[73] Assignee: Litton Systems, Inc., Woodland Hills, Calif.

[21] Appl. No.: 846,856

[22] Filed: Apr. 1, 1986

[51] Int. Cl.⁴ .............................................. G01C 19/64
[52] U.S. Cl. ................................................... 356/350
[58] Field of Search .................... 350/350; 310/19, 27

[56] References Cited

U.S. PATENT DOCUMENTS

| | | | |
|---|---|---|---|
| 3,464,657 | 9/1969 | Bullard | 356/350 |
| 3,775,625 | 11/1973 | Brosch et al. | 310/19 |
| 4,115,004 | 9/1978 | Hutchings et al. | 356/350 |
| 4,213,705 | 7/1980 | Sanders | 356/350 |
| 4,309,107 | 1/1982 | McNair | 356/350 |
| 4,597,667 | 7/1986 | Curby et al. | 356/350 |

FOREIGN PATENT DOCUMENTS 0175474  9/1985  Japan .................................... 372/94

Primary Examiner—Davis L. Willis
Assistant Examiner—S. A. Turner
Attorney, Agent, or Firm—Poms, Smith, Lande & Rose

[57] ABSTRACT

A means for stressing the hub of a laser gyro dither mechanism is provided including a compression bolt passing through an aperture in the hub and having a nut threaded thereon for tightening against the hub until a desired dither frequency is achieved. In an alternative embodiment, the hub is stressed by placing it in tension using a rod within an aperture passing partway through the hub and having a set screw threaded into the aperture such that tightening the set screw forces the rod against the bottom of the aperture to place the hub in tension. The set screw is similarly tightened until a desired dither frequency is achieved. With either of these embodiments, dither frequencies of individual gyros can be adjusted after the gyro system is operational to separate dither frequencies to minimize mechanical frequency interference among the gyros.

12 Claims, 4 Drawing Figures

TUNING MECHANISM FOR DITHER FREQUENCIES IN A RING LASER GYROSCOPE

FIELD OF THE INVENTION

This invention relates to laser gyroscopes and more particularly to those employing a drive mechanism to create a dither movement. The invention is particularly applicable for laser gyroscopes to be used in a navigation system using a plurality of such dithered gyroscopes within a multi-dimensional navigation system.

BACKGROUND OF THE INVENTION

Laser gyroscopes used for navigation often include mechanisms for individually dithering gyroscope mirrors or the entire gyroscope to avoid a problem in such systems known as "mode locking." Mode locking is the tendency of two counter rotating beams of light to appear to have the same frequency at low levels of angular velocity due to noise or light scattering, which results in a loss of the desired beat frequency produced by the laser gyroscope.

Although dithering solves the mode locking problem, it may create an additional problem when the dither frequencies are transmitted to the gyro case. Dithering the mirror or entire gyro causes vibrations which, if trnasmitted to the case, can interfere with the input or output of other instruments or gyros within a navigation system in which the first gyro is utilized. More particularly, when two or more of the gyros are mounted to a common base and are vibrating at close to the same frequencies, but not at identical frequencies, vibrations of one gyro can interfere with vibrations of the other gyros, either constructively, destructively, or both. In other words, the vibrational energy of one gyro can be transmitted to the others through the gyroscope mountings. This transmission of energy creates problems such as dither frequency lock-in, dither beating, and low dither depth which adversely affect the accuracy of the navigation system.

Although this interference can be reduced by providing an isolation arrangement within each gyro, it is not entirely eliminated. An example of an isolation arrangement may be found in U.S. Pat. No. 4,115,004 to Hutchings et al., assigned to the assignee of the present invention.

Further reduction of the interference can be provided by complex spring systems in the gyro hub such as the single spring system fround in U.S. Pat. No. 3,464,657 to Bullard which issued on Sept. 2, 1969, assigned to the United States of America, and the three-spring system taught in U.S. Pat. No. 4,309,107 to McNair, et al., entitled "Laser Gyroscope Dither Mechanism" which is assigned to the assignee of the present invention. Although the spring mounted gyro as taught in the McNair et al. patent substantially eliminates the mode locking problem, it is a complex arrangement which may not be necessary in some less demanding applications.

A less complex alternative for reducing the effect of vibrational interference by transmission of dither vibrations to the case is to tune the vibrational frequencies of the dithering gyros to either identical frequencies or frequencies of sufficiently different periods to avoid mechanical vibrational interference among them and hence minimize these problems.

Although dither frequencies of the individual gyros can be tuned electronically, this requires adding components to the gyroscope system. It has been found that by placing a portion of each gyroscope mounting structure in either tension or compression, the dithering for the separate gyroscopes can be effectively tuned to sufficiently different frequencies to eliminate the problems associated with mechanical interference of dither frequencies among the gyros.

SUMMARY OF THE INVENTION

The present invention provides a mechanical means for effectively tuning dither frequencies of gyros in an inertial navigation system including a plurality of ring laser gyros each dithered about a gyro hub. The invention includes a means for adjusting the stress force in each gyro hub to tune the dither frequency of each gyro to a desired frequency for minimizing mechanical frequency interference among the gyros. The stress force adjusting means can be either a means of applying compression force or a means for applying tension force. In a preferred embodiment, the tension or compression force is applied to a central portion of the gyro hub.

For applying a compression force, the means can be a threaded bolt passing through an aperture in the hub and a means for threadably engaging the bolt, for example a nut or a threaded portion of the hub aperture. With this arrangement, the bolt head and the nut compress the hub for tuning the dither frequencies. For applying a tension force, the means can be a rod located within a hub aperture and means closing the hub aperture for compressing the rod within the hub thereby placing the hub in tension for tuning the dither frequencies. The aperture closing means can be, for example, a threaded rod for engaging the aperture hub threads.

DETAILED DESCRIPTION OF PREFERRED EMBODIMENTS

Figure 1:
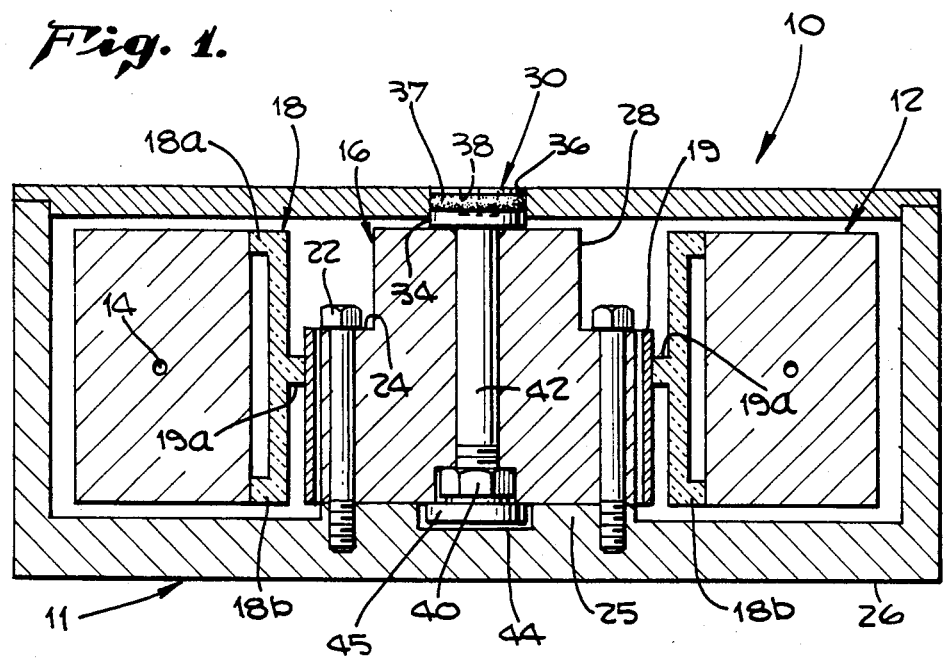
FIG. 1 is a cross-sectional view of a laser gyroscope mounted about a central hub including dithered flexure arms and a means for compressing the hub in accordance with the invention.

With reference to FIG. 1, there is shown a gyro 10 mounted within a gyro case 11 and including a gyro body 12 having a laser path passageway 14. The gyro body 12 is mounted to a central hub 16 by an annular support ring 18. The support ring 18 is preferably formed of a glass ceramic material having a very low coefficient of expansion to minimize the effects of thermal expansion and compression of the hub 16 and the gyro 10. In this particular arrangement, the support ring 18 is mounted to the gyro body 12 at annular shoulders 18a and 18b, and to webs 19 at annular shoulder 19a, by an adhesive. The entire assembly including the gyro 10, support ring 18, and the hub 16 is mounted to the a gyro case 11 by mounting screws 22 passing through flexure arms 24 and threaded into boss 25 extending from base 26 of the gyro case 11. Although the invention will be described with reference to this particular arrangement of gyro and hub, the invention is not limited thereto and can be used with any mounting arrangement for placing the gyro and hub within its case.

The hub 16 includes a central massive portion 28 and the less massive flexure arms 24 and the thin webs 19. The webs 19 are vibrated by any suitable dithering mechanism such as an electronic means for imposing a fixed frequency vibration, to vibrate the support ring 18 and hence the gyro body 12. As can be appreciated by one skilled in the art, although the actual vibration frequency of the webs 19 and flexure arms 24 can be accurately controlled, the frequency of vibrations actually transmitted to the gyro case is a complex function of multiple variables within the individual gyro system such as the masses and structural makeup of the individual components of the system and the particular torque on the mounting screws 22. For this reason, even with relatively precise manufacturing and assembly procedures, actual dither frequencies of individual, identically designed gyros within a multi-gyro navigation system will vary.

Figure 3:
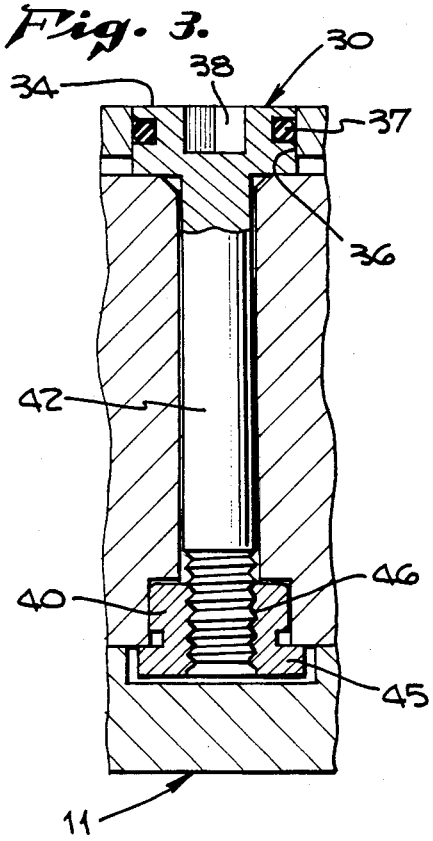
FIG. 3 is an enlarged cross-sectional view of the exemplary embodiment of the hub compression means in accordance with the present invention shown in FIG. 1.
Figure 2:
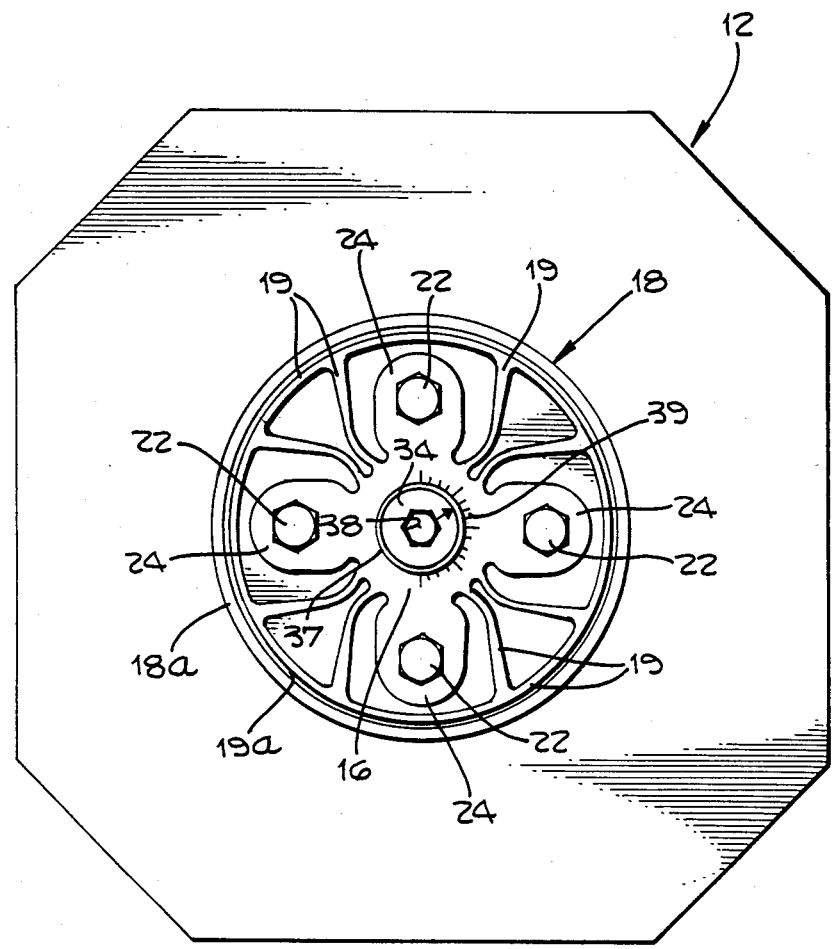
FIG. 2 is a top view of the laser gyroscope and central hub of FIG. 1.

The present invention provides a means for tuning dither frequencies of gyros within an inertial navigation system by stressing the central portion 28 of the hub 16. An exemplary embodiment of the stressing means is shown in FIG. 3 as a compression means and in FIG. 4 as a tensioning means. With reference to FIG. 3, a compression means 30 is shown which includes a head portion for abutting the top surface and a base portion for abutting the bottom surface of the hub. In the embodiment illustrated in FIGS. 1, 2 and 3, head portion 34 is shaped and fits within a correspondingly shaped recess 36 in top of the gyro case 11. A sealing means, e.g. O-ring 37, is provided for sealing between the recess 36 and head portion 34 for assuring a gas tight seal between the interior and exterior of the gyro case 11, and for maintaining the head in position after it is adjusted as discussed below. The head 34 further includes a slot 38 for receiving a tool such as a scrw driver or Allen wrench for adjusting the compression placed on the hub by the compression means 30. Reference markings 39, as shown in FIG. 2, can be provided about the recess 36 and on the head 34 for ease in determining the adjusted position of the compression means 30.

The base portion of the compression means includes a nut 40 for threadably engaging a threaded portion of stem 42 of the compression means 30. In the illustrated embodiment, the nut 40 has an hexagonal shape and fits tightly in a recess 44 in the bottom of the hub portion 28 such that the recess 44 functions to maintain the nut 40 in position. The illustrated compression means 30 further includes a flanged end 45 for abutting against the bottom of the hub. With this arrangement, the head receiving recess 36 and the nut receiving recess 44 function to maintain the head 34 and nut 40 in position within the assembled gyro and case, while the slot 38 in the head 34 can be accessed from outside of the gyro case while the gyro is operating.

A locking means 46 is provided on the threads of the stem 42 so that once the nut 40 is tightened against the bottom of the hub 28, it cannot be loosened by vibration of the system. The locking means illustrated in the drawing at 46 may be any means for securing a nut in a fixed location on threads, such as an elastomeric tape or member place on the threaded portion of the stem portion 42 of the compression means. An example of such a locking means is the product sold under the trademark NyLok. As can be appreciated, because the gyro 10 is constantly vibrating, all of its mounting screws must be secured in a similar manner to prevent their being loosened by the system vibrations.

Once the compression means has been incorporated into the gyro hub assembly and the system installed in its case, with all of the mounting screws locked in place, the gyro will dither at a fixed, although not precisely predictable, frequency. With this arrangement, once the gyro is assembled and the dithering system is operating, the head 34 can be turned using an appropriate tool in the slot 38 to tighten the head 34 and nut 40 against the hub to alter the compression force on the hub central portion 16 to alter the frequency of vibrations transmitted to the gyro case 11 through the mounting screws 22.

In a multi-gyro system, once each of the gyros have been assembled and their screws locked, and the gyros mounted together in the system, they will dither at their individual frequencies, but subject to the mechanical dither frequency interference among them which can cause the problems of dither frequency lock-in, dither beating, and low dither depth which adversely affect the accuracy of the navigation system. By incorporating the present invention in such a multigyro system, the gyros can be effectively tuned after assembly to substantially eliminate the problems associated with the transfer of vibrations among the gyros through their common mounting. More particularly, once the gyro is operational, and incorporated in a navigation system including a plurality of gyros, each being modified to incorporate the hub stressing means of the present invention, with the gyro dither mechanism operating, the nut 40 is tightened until the dither frequencies of the individual gyros are sufficiently different that their interference of one another is minimized or substantially removed.

The present invention thus provides a simple, mechanical means for tuning the dither frequencies of the gyros by a simple turning of the nut 40 on each gyro until there is no perceptible dither frequency beating, and dither depth is acceptable without dither frequency lock-in. In a three gyro system, for example, only two of the gyro mounting systems need to be modified to incorporate the stressing means in their hubs, because the object is to simply separate the dither frequencies. For this reason, the desired separation can be accomplished by adjusting the frequencies of two of the gyros relative to each other and to the third unmodified gyro.

Although in theory, the individual gyros could be tuned to exactly the same frequency using the present invention, in practice it would be very difficult to achieve this exact result. For this reason, it is preferred to simply separate the frequencies by an amount sufficient to avoid mechanical interference of one vibrating gyro on another mounted within the same system.

Figure 4:
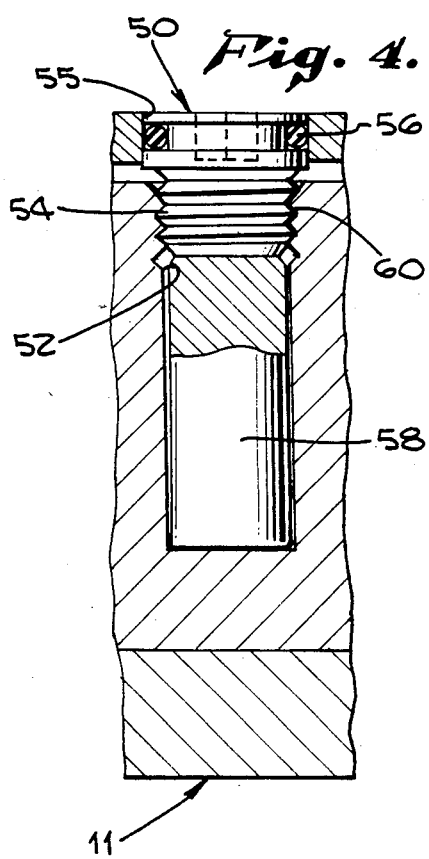
FIG. 4 is an enlarged cross-sectional view of an exemplary embodiment of the present invention showing the means for placing the hub in tension.

Turning now to the alternative embodiment of the means for stressing the hub 16 as shown in FIG. 4, a hub tensioning means 50 is provided in the hub central portion 28 instead of the compression means 30 shown in FIG. 3, but similarly centrally located. The hub tensioning means 50 includes an aperture 52 partially through the hub 16 having a first portion threaded for receiving a tensioning screw 54. The top of the case 11 includes a recess 55 similar to the recess 36 in the previous embodiment and the screw head includes a sealing means, e.g. O-ring 56, similar to the O-ring 37 in the previous embodiment. A spacer element, e.g. dowel 58, is provided within the aperture 52 such that tightening the screw 54 forces the dowel 58 against the hub thereby putting the hub in tension. A locking means 60 similar to the nut locking means 46 discussed above is provided on the screw threads to assure that once it is tightened to achieve the desired tension and hence dither tuning, it will not be loosened by vibration of the system. In operation, the tensioning means 50 provides the same function as the compression means 30 in that it alters the frequency of vibrations transmitted to the gyro case 11 from the dithering system by applying a stressing force to the central hub portion 28.

Although the means for stressing the hub has been described with reference to an exemplary gyro mounting and dithering system, the invention is not limited thereto and can be used with any gyro dithering system and gyro mounting system. In addition, although particular embodiments for stressing the hub have been described in detail, other stressing means can be employed. For example, the invention is not limited to the particular shape and arrangement of compression head and nut, and tensioning dowel and screw, but can be practiced using any means for placing the hub in either mechanical tension or compression. Other modifications of the invention can be made without departing from the spirit of the invention, the scope of which is defined by the following claims.

What is claimed is:

1. In an inertial navigation system, including a plurality of ring laser gyros, each dithered about a gyro spring system at a dither frequency, the improvement comprising:
    means for adjusting the stress force orthogonal to the center of the rotational plane of each of the ring laser gyros in each gyro spring system after the gyro spring system is operational to tune said dither frequency of each gyro to a desired frequency for minimizing mechanical frequency interference among the gyros.

2. The improved inertial navigation system of claim 1 wherein the desired frequency of each gyro is the same.

3. The improved inertial navigation system is claim 1 wherein the desired frequency of each gyro is sufficiently different to substantially avoid mechanical vibrational inteference among the gyros.

4. The improved inertial navigation system of claim 3 wherein said stress force is a calibrated compression force.

5. The improved inertial navigation system of claim 3 wherein said stress force is a calibrated tension force.

6. The improved inertial navigation system of claim 4 wherein said spring system includes a central hub and said compression force is placed upon said hub.

7. The improved inertial navigation system of claim 6 further comprising:
    said central hub having an aperture therein passing through said hub;
    a threaded bolt passing through said hub aperture; and
    means to threadably engage said bolt for compressing a portion of said hub.

8. The improved inertial navigation system of claim 7 wherein said means to threadably engage said bolt for compressing said hub portion is a nut on the end of said bolt.

9. The improved inertial navigation system of claim 5 wherein said spring system includes a central hub and said tension force is placed upon said hub.

10. The improved inertial navigation system of claim 9 further comprising:
    said central hub having an aperture therein passing partially through said hub;
    a rod located within said hub aperture; and
    means closing said hub aperture for compressing said rod while placing said hub in tension.

11. The improved inertial navigation system of claim 10 further comprising:
    said hub aperture threaded at its opening; and
    said means closing said hub aperture is a threaded member engaging said hub threads.

12. The improved inertial navigation system of claim 1, wherein the stress force adjusting means is calibrated.

* * * * *